United States Patent Office 3,480,604
Patented Nov. 25, 1969

3,480,604
ETHYLENE POLYMERISATION PROCESS IN THE PRESENCE OF FREE RADICALS AND SOLID CATALYSTS INCLUDING CERTAIN TRIHALIDES OF VANADIUM OR TITANIUM
Edward William Duck, Dibden Purlieu, and Brian John Ridgewell, Hythe, Southampton, England, assignors to The International Synthetic Rubber Company Limited, Southampton, England, a corporation of the United Kingdom
No Drawing. Filed July 21, 1966, Ser. No. 566,738
Claims priority, application Great Britain, July 27, 1965, 32,004/65
Int. Cl. C08f 15/04
U.S. Cl. 260—88.2
15 Claims

ABSTRACT OF THE DISCLOSURE

A polymerisation process comprising the step of polymerising monomers in the presence of free radicals generated from diazomethane in the vicinity of a solid catalyst, the monomers being selected from the group consisting of (a) ethylene and (b) mixtures of ethylene and other alpha-olefins, the solid catalyst, when the monomer is ethylene being selected from the group consisting of (a) trihalides of vanadium, (b) trihalides of titanium and (c) mixtures of trihalides of vanadium and trihalides of titanium, wherein the halides exclude fluorides, and when the monomer is a mixture of ethylene and other alpha-olefins, at least vanadium trihalide is present in the solid catalyst, wherein the halides exclude fluorides.

---

The present invention relates to the polymerisation of ethylene and to the copolymerisation of ethylene with other α-olefins.

It is well known that ethylene can be polymerised to high molecular weight polymers using free-radical or other suitable initiators, providing a high enough pressure is applied. Only low molecular weight products are formed if high pressures are not used. More recently it has been found that the so-called Ziegler/Natta catalysts will polymerise ethylene to high molecular weight polymers at normal, i.e. atmospheric, pressure. Ziegler/Natta catalysts are two-component catalysts and consist of an organo-metallic compound and a transition metal compound e.g. aluminium tri-ethyl and titanium tetrachloride. One of the products of reaction between the components of a Ziegler/Natta catalyst has been shown to be a reduced form of the transition metal compound. Thus, titanium tetrachloride is reduced to solid titanium trichloride. Various mechanisms have been postulated to explain Ziegler/Natta catalysis, but as yet there is no generally accepted theory. From the studies of Ziegler/Natta catalysed polymerisation, it has however been established that where a heterogeneous surface is formed (e.g. titanium or vanadium trichloride), the monomer to be polymerized is adsorbed and activated by the said surface. Initiation o fthe polymerisation reaction in the presence of a Ziegler/Natta catalyst results, in an undefined way, from some reaction product or complex of the organo-metallic (e.g. aluminium alkyl) component. The reduced form of the transition metal compound, such as titanium or vanadium trichloride, alone in the absence of the organo-metallic component is not an active polymerisation catalyst. Addition of the usual free radical initiators such as peroxides or azobisdiisobutyronitrile (AZDN) to the olefinic monomers in the presence of the reduced form of the transition metal compound, titanium or vanadium trichloride, does not produce an effective catalyst system.

The reason why free radical initiators have been found to be ineffective when used in conjunction with, for example, titanium trichloride, is that since free radicals have only a short half-life, it is essential that they should be produced at exactly the right time and in the right place. Thus, when it is required to produce high molecular weight polymers, it is necessary to ensure that the free radicals are produced where the monomer concentration is sufficiently high to give high molecular weight products. It is for precisely this reason that it is usually necessary to employ high pressures when polymerising ethylene in the presence of free radicals.

Diazomethane, $CH_2N_2$, in the presence of certain metals and surfaces, decomposes to nitrogen and methylene. The latter, —$CH_2$—, instantly polymerises to polymethylene $(CH_2)_n$. In the presence of an olefin but in the absence of any surface, the methylene will react with the olefin to form a cyclopropane derivative:

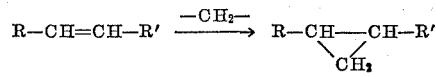

By carrying out the decomposition of diazomethane at the surface of a material which also adsorbs ethylene, propylene and other olefinic monomers, and in the presence of these monomers, large yields of homopolymers and copolymers of ethylene can be obtained at ambient temperatures and pressures.

We have now developed a method of producing the initiating species, i.e. methylene radicals, from diazomethane at the right time and in the right place and, as a result, have found a method of not only producing homopolymers of ethylene but also of copolymerising ethylene with other α-olefins. The latter is particularly important since copolymerisation of ethylene with another olefin has never previously been achieved by the use of free radicals, even at elevated pressures, but only by using Ziegler/Natta catalysts.

According to the present invention we provide a process for the polymerisation of ethylene in the presence of a solid catalyst including vanadium or titanium trihalide, but excluding the fluorides, wherein active free radicals are generated at the surface of or in the vicinity of the solid catalyst, from diazomethane. As well as the vanadium or titanium trihalide, the catalyst may also include an aluminium trihalide, e.g. aluminium trichloride, and the presence of an aluminium trihalide has been found to greatly increase the yield of polymer. Any proportion of aluminium trihalide with respect to vanadium or titanium may be employed.

When the catalyst system includes a vanadium trihalide (excluding the fluoride) then it is also effective in copolymerising ethylene with a second α-olefin. Examples of such α-olefins include propylene and butene-1. All proportions of ethylene and second α-olefin may be polymerised in this way.

Suitable surfaces for this method of (co-) polymerising ethylene include vanadium trichloride, titanium trichloride, vanadium trichloride-aluminium chloride, vanadium trichloride-titanium trichloride. However, only vanadium trichloride will copolymerise ethylene with a second olefin; titanium trichloride gives only polyethylene even with a mixed feed. Factors which affect the efficiency of the process are surface area, particle size, and chemical characteristics of the adsorbing material.

Particle size is of great importance. We have found that the order of activity of the surface increases with decrease in particle size. Thus commercial vanadium trichloride is less active than ball-milled commercial vanadium trichloride which in turn is less active than vanadium trichloride prepared in situ.

It is also essential that the surface is electron deficient so that it will be capable of absorbing olefins strongly.

The trihalides of vanadium or titanium may be produced in situ by reduction of the tetrahalides with an aluminium alkyl e.g. aluminium n-butyl. If this method of preparation is used then it is advisable to employ amounts of vanadium and/or titanium such that the ratio of transition metal to aluminium is greater than or equal to 3 (molar proportions). This ensures that no aluminium alkyl is left in solution after reduction of the tetrahalide.

The polymerisation may be carried out at a temperature within the range $-30°$ C. to $+150°$ C., preferably within the range $-20°$ C. to $+50°$ C.

Usually, polymerisation is conducted in a hydrocarbon solvent, but the presence of such a medium is not essential to the reaction. Any hydrocarbon solvent may be used, e.g. hexane, decalin, cyclohexane, iso-octane, and aromatic hydrocarbons may also be used, e.g. toluene, but tend to decrease the yield of polymer, probably due to the formation of complexes between the solvent and catalyst surface. Liquid media other than hydrocarbons may also be used, providing that they do not interfere with the adsorptive or activating powers of the heterogeneous surface.

The following examples illustrate the invention:

In all the following examples a strictly anhydrous (ca. 0.1 p.p.m. $H_2O$) and oxygen-free atmosphere of nitrogen was maintained. All solvents, monomers and initiators were dried as carefully and as thoroughly as possible. All apparatus was glass with ground joints.

EXAMPLE 1

(a) 3.96 g. (20.5 mmole) of freshly prepared $VCl_4$ was dissolved in approximately 300 ml. of dry hexane at room temperature and 1.13 g. (5.7 mmole) of $Al(nBut)_3$ was added (V:Al=3.6). An exothermic reduction ensued and purple $VCl_3$ was precipitated. The solution was refluxed for one hour to ensure complete reduction. The solution was cooled and the precipitate settled. The precipitate was then washed with four separate amounts of 300 ml. hexane, and the suspension made up to about 300 ml. with a further portion of hexane. Ethylene (120 ml. $min.^{-1}$) was then bubbled through the stirred solution at 20° until the $VCl_3$ was saturated (1 hour, absorption checked by manometer).

The solution and precipitate were then poured into methanol to which a small quantity of dilute HCl had been added. The catalyst slowly dissolved to a clear green solution: no polymer was formed.

In the absence of suitable initiators, $VCl_3$ will not catalyse the polymerisation of ethylene.

(b) 18.5 mmole of $TiCl_4$ and 5.76 mmole of $Al(nBut)_3$ [Ti/Al=3.2] were refluxed in 300 ml. Decalin for 1 hour until all $TiCl_3$ had been converted to the γ-form. The precipitate was then washed with hexane as in Example 1(a) and saturated with ethylene (300 ml. $min.^{-1}$) at 20° for 20 minutes after which there was no further absorption. On pouring the contents of the flask into acid methanol, a clear solution was formed and no polymer separated.

Thus, as with $VCl_3$, γ-$TiCl_3$ will not polymerise ethylene in the absence of suitable initiators.

To a mixture of 9.5 mmole $VCl_4$ and 9.5 mmole $TiCl_4$ in 300 ml. hexane was added 6.3 mmole $Al(nBut)_3$ $$\frac{V+Ti}{Al}=3.0$$

The procedure was exactly as for Example 1(a) and again no polymer was formed.

The mixed crystalline $VCl_3=TiCl_3$ combination is also inactive for polymerisation of ethylene in the absence of suitable initiators.

EXAMPLE 2

(a) 19.1 mmole of $VCl_4+6.30$ mmole $Al(nBut)_3$ [V/Al=3.04] in hexane were treated as in Example 1(a). After saturation with ethylene (120 ml. $min.^{-1}$), 0.175 g. (0.95 mmole) of azobisdiisobutyronitrile dissolved in 130 ml. of hexane/toluene (2:1 v./v.) was added. Ethylene was passed at the same rate and the solution was brought to reflux (magnetic stirring). Reaction continued for 2 hours. The contents of the flask were then cooled and poured into acidic methanol. No polymer was produced.

(b) 18 mmole of $TiCl_4+5.95$ mmole $Al(nBut)_3$ [Ti/Al=3.0] in Decalin were refluxed for 1 hour. The experiment was continued as for Example 2(a). No polymer was formed.

(c) 20 mmole $VCl_4+6.30$ mmole $Al(nBut)_3$ [V/Al=3.2] were treated as in Example 1(a). After saturation with ethylene (120 ml. $min.^{-1}$), 0.25 g. (1 mmole) benzoyl peroxide dissolved in 150 ml. of hexane/toluene (2:1 v./v.) was added. The experiment was continued as for Example 2(a) except that reaction was allowed to proceed for 12 hours. No polymer was produced.

(d) 20 mmole $TiCl_4+6.5$ mmole $Al(nBut)_3$ [Ti/Al=3.1] were treated as in Example 2(b). After saturation with ethylene (120 ml. $min.^{-1}$), 0.27 g. (1.1 mmole) of benzoyl peroxide dissolved in 150 ml. of hexane/toluene (2:1 v./v.) was added. The experiment was continued as for Example 2(c). No polymer was produced.

EXAMPLE 3

(a) 17.4 mmoles $VCl_4+6.0$ mmoles $Al(nBut)_3$ [V/Al=2.9] were dissolved in 300 ml. hexane. The experiment was carried out as in Example 1(a). After saturation with ethylene (300 ml. $min.^{-1}$, 1 hr.) at 20° an aliquot sample of 40 ml. was withdrawn into acid methanol from the stirred contents of the flask, no polymer was formed. To the remainder of the solution and precipitate was added 0.05 g. (1.2 mmole) of diazomethane dissolved in 70 ml. n-hexane. A slightly exothermic reaction ensued and nitrogen was evolved for about 1 min. following the addition. Ethylene, bubbling through the solution was then strongly absorbed. The monomer was passed through the solution for a further 1¼ hours, after which there was no further absorption. On pouring into acid methanol, polymer was precipitated. After working up, 7.3 g. polyethylene was isolated.

(b) 18.5 mmole $TiCl_4+5.76$ mmole $Al(nBut)_3$ [Ti/Al=3.21] in 300 ml. Decalin were refluxed for 1 hour. The procedure described in Example 1(a) was followed. The solution was cooled to 0°. After saturation with ethylene at 0° (300 ml. $min.^{-1}$, ½ hour) an aliquot of 40 ml. was withdrawn (as in Example 3(a)); no polymer was formed. 0.33 g. (7.9 mmole) $CH_2N_2$ in 76 ml. hexane was injected. Experiment proceeded as in Example 3(a). 2.1 g. of polyethylene was produced.

EXAMPLE 4

10.83 g. purified commercial $VCl_3$ was ball-milled under anhydrous nitrogen in 250 ml. hexane for 120 hours. 67 ml. of this solution (18.4 mmole $VCl_3$) was added to 300 ml. hexane and well stirred. The contents of the flask were cooled to 0° and saturated with ethylene (300 ml. $min.^{-1}$) for 1 hour. A 40 ml. aliquot withdrawn as in Example 3(a) gave no polymer. 0.29 g. (7 mmole) $CH_2N_2$ in 79 ml. hexane was injected. The experiment proceeded as in Example 3(a). 1.5 g. polyethylene was produced.

EXAMPLE 5

To 183 ml. of the ball-milled solution of $VCl_3$ used in Example 4 was added 2.26 g. anhydrous $AlCl_3$. The solution was ball-milled for a further 22 hours.

67 ml. of this solution (18.4 mmole $VCl_3$, 6.2 mmole $AlCl_3$) were treated as for Example 4. 0.31 g. (7.4 mmole) $CH_2N_2$ in 77 ml. hexane were added.

10 g. polyethylene was isolated.

EXAMPLE 6

6.12 mmole $VCl_4+2.32$ mmole $Al(nBut)_3$ [V/Al=2.7] were treated as for Example 3(a) except that a mixture of ethylene (120 ml. $min.^{-1}$) and propylene (200 ml.

min.$^{-1}$) was used and a temperature of 0° was used as saturation and reaction temperature. After saturation an aliquot sample (40 ml.) gave no polymer. 0.36 g. (8.6 mmole) of $CH_2N_2$ in 79 ml. hexane was added and the reaction allowed to proceed for 8 hours in the continued presence of ethylene/propylene; 9.6 g. of a rubbery polymer was isolated. Infra-red analysis (using the bands at 7.25 and 6.85$\mu$) gave the composition as 51 moles percent $C_3H_6$. Intrinsic viscosity (0.1% solution in Decalin at 130°) was 2.4.

EXAMPLE 7

9.52 mmoles $TiCl_4$+10.5 mmole $VCl_4$+4.54 mmole Al(nBut)$_3$ $$\left[\frac{V+Ti}{Al}=4.4\right]$$

were treated as for Example 6 except that a saturation and reaction temperature of 20° was used. 0.32 g. (7.6 mmole) $CH_2N_2$ in 73 ml. hexane was added and the reaction allowed to proceed for 6 hours. On working up, 12 g. of a rubbery polymer was isolated. I.R. analysis gave 67 moles percent $C_3H_6$. I.V. was 1.4.

EXAMPLE 8

18.4 mmole $VCl_3$ (ball milled solution) was treated as in Example 4, except that a mixture of ethylene (120 ml. min.$^{-1}$) and propylene (200 ml. min.$^{-1}$) was used for saturation and reaction (0°). 0.30 g. (7.1 mmole) $CH_2N_2$ in 80 ml. hexane was injected and reaction allowed to proceed for 1½ hours. After working up, yield was 1.0 g. of a rubbery polymer. I.R. analysis gave 53 moles percent $C_3H_6$. I.V. was 2.5.

EXAMPLE 9

18.4 mmole $VCl_3$+6.2 mmole $AlC_3$ (ball milled solution) were treated as in Example 8. 0.30 g. (71 mmole) $CH_2N_2$ in 80 ml. hexane was injected and reaction allowed to proceed for 3 hours. After working up, the yield was 12 g. of a rubber. I.R. analysis gave 62 moles percent $C_3H_6$. I.V. was 1.7.

EXAMPLE 10

5.52 mmole $VCl_3$+1.85 mmole $AlCl_3$ (ball-milled in hexane) were treated as in Example 8. 0.3 g. (71 mmole) $CH_2N_2$ in 71 ml. hexane was added and the reaction allowed to proceed for 3 hours. After working up the yield was 8.7 g. of rubber. I.R. analysis gave 65 moles percent $C_3H_6$. I.V. was 2.0.

EXAMPLE 11

1 mmole $VCl_3$+0.34 mmole $AlCl_3$ (ball-milled in hexane) were treated as in Example 8. 0.33 g. (7.9 mmole) $CH_2N_2$ in 80 ml. hexane was injected and the reaction allowed to proceed for 6 hours. The yield was 3.6 g. rubber. I.R. analysis gave 60 moles percent $C_3H_6$. I.V. was 2.0.

EXAMPLE 12

5.85 mmole $AlCl_3$ (ball milled in hexane) was treated as in Example 8. 0.29 g. (6.9 mmole) $CH_2N_2$ in 72 ml. hexane was added and the reaction allowed to proceed for 2 hours. No polymer was produced.

EXAMPLE 13

18 mmole $VCl_3$+6 mmole $AlCl_3$ (ball milled in hexane) were treated as in Example 4 except that the monomers used were a mixture of ethylene and butene-1. 0.6 g. (14.2 mmole) $CH_2N_2$ in 160 ml. hexane was injected and reaction allowed to proceed for 2 hours. On working up 5 g. of an ethylene-butene-1 co-polymer was produced which had I.V. of 3.7.

What is claimed is:

1. A polymerisation process comprising the step of polymerising monomers in the presence of free radicals generated from diazomethane in the vicinity of a solid catalyst, said monomers being selected from the group consisting of (a) ethylene and (b) mixtures of ethylene and toher alpha-olefins, the solid catalyst, when said monomer is ethylene being selected from the group consisting of (a) trihalides of vanadium, (b) trihalides of titanium and (c) mixtures of trihalides of vanadium and trihalides of titanium, wherein said halides exclude fluorides, and when said monomer is a mixture of ethylene and other alphaolefins, at least vanadium trihalide is present in the solid catalyst, wherein the halides exclude fluorides.

2. The process of claim 1 wherein said solid catalyst includes aluminum trihalide.

3. The process of claim 1 wherein said trihalides are prepared in situ by reduction of the tetrahalide of the metal with an aluminum alkyl and the molar proportion of the metal to aluminum is not less than 3.

4. The process of claim 1 wherein said polymerisation is carried out at a temperature within the range of from minus 30° C. to plus 150° C.

5. The process of claim 1 wherein said polymerisation is carried out in a hydrocarbon solvent.

6. The process of claim 1 wherein said monomers are mixtures of ethylene and other alpha-olefins and said catalyst includes at least trihalide of vanadium.

7. The process of claim 2 wherein said halides are chloride.

8. The process of claim 3 wherein said aluminum alkyl is aluminum n-butyl.

9. A polymerisation process according to claim 4 in which the temperature is in the range from −20° C. to +50° C.

10. The process of claim 7 wherein said polymerisation is carried out at a temperature within the range of from minus 30° C. to plus 150° C.

11. A polymerisation process according to claim 10 in which the temperature is in the range from −20° C. to +50° C.

12. The process of claim 6 wherein said catalyst includes aluminum trihalide.

13. The process of claim 6 wherein said other alpha-olefin is butene-1.

14. The process of claim 12 wherein said halide is chloride and said copolymerisation is carried out at a temperature within the range of from minus 30° C. to plus 150° C.

15. A polymerisation process according to claim 14 in which the temperature is in the range from −20° C. to +50° C.

References Cited

UNITED STATES PATENTS

| | | | |
|---|---|---|---|
| 2,478,066 | 8/1949 | Van Peski | 260—94.9 |
| 2,567,109 | 9/1951 | Howard | 260—94.9 |
| 2,962,489 | 11/1960 | Zeldin | 260—94.9 |
| 2,387,784 | 10/1945 | Thomas | 260—94.9 |
| 3,197,449 | 7/1965 | Reding et al. | 260—94.9 |
| 3,341,506 | 9/1967 | Wang | 260—94.9 |

JOSEPH L. SCHOFER, Primary Examiner

EDWARD J. SMITH, Assistant Examiner

U.S. Cl. X.R.

252—429; 260—94.9